United States Patent
Kojima

(10) Patent No.: US 9,557,067 B2
(45) Date of Patent: Jan. 31, 2017

(54) AIR CONDITIONING SYSTEM WITH HEAT PUMP SECTION AND SEPARATE HEAT SOURCE SECTION

(71) Applicant: DAIKIN INDUSTRIES, LTD., Osaka-shi, Osaka (JP)

(72) Inventor: Akiharu Kojima, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/115,210

(22) PCT Filed: Jan. 27, 2015

(86) PCT No.: PCT/JP2015/052215
§ 371 (c)(1),
(2) Date: Jul. 28, 2016

(87) PCT Pub. No.: WO2015/115434
PCT Pub. Date: Aug. 6, 2015

(65) Prior Publication Data
US 2016/0334115 A1    Nov. 17, 2016

(30) Foreign Application Priority Data

Feb. 3, 2014    (JP) ................. 2014-018777

(51) Int. Cl.
F24D 19/10    (2006.01)
F24D 5/12    (2006.01)
(Continued)

(52) U.S. Cl.
CPC . *F24D 5/12* (2013.01); *F24D 5/04* (2013.01); *F24D 19/1087* (2013.01);
(Continued)

(58) Field of Classification Search
CPC ........ F24D 5/12; F24D 15/04; F24D 19/1087; F24D 2200/12; F24D 2200/123; F24F 2203/02; F25B 30/02
See application file for complete search history.

(56) References Cited

U.S. PATENT DOCUMENTS

| 4,143,707 A | 3/1979 | Lewis et al. |
| 6,176,306 B1 * | 1/2001 | Gault ................. F24D 19/1087 165/240 |

(Continued)

FOREIGN PATENT DOCUMENTS

| JP | 64-54160 A | 3/1989 |
| JP | 2010-255985 A | 11/2010 |
| JP | 5861726 B2 | 1/2016 |

OTHER PUBLICATIONS

International Search Report of corresponding PCT Application No. PCT/JP2015/052215 dated Apr. 28, 2015.
(Continued)

*Primary Examiner* — Jonathan Bradford
(74) *Attorney, Agent, or Firm* — Global IP Counselors

(57) ABSTRACT

An air conditioning system includes a heat pump section performing indoor air-warming by using a vapor-compression refrigeration cycle, a separate heat source section performing indoor air-warming by using a heat source separate from the heat pump section, and a control unit configured to control actions of the heat pump section and the separate heat source section. When an operation is switched from a separate heat source air-warming operation to a heat pump air-warming operation, the control unit starts the heat pump air-warming operation while the separate heat source air-warming operation is continued, and after an overlapping air-warming ending condition is met, the control unit ends the separate heat source air-warming operation. The overlapping air-warming ending condition is that a temperature difference resulting from subtracting a target indoor temperature from an indoor temperature is equal to or (Continued)

greater than an overlapping air-warming ending air temperature difference.

1 Claim, 14 Drawing Sheets

(51) Int. Cl.
*F24D 5/04* (2006.01)
*F25B 13/00* (2006.01)
*F25B 30/02* (2006.01)

(52) U.S. Cl.
CPC ...... *F24D 2200/12* (2013.01); *F24F 2203/02* (2013.01); *F25B 13/00* (2013.01); *F25B 30/02* (2013.01)

(56) References Cited

U.S. PATENT DOCUMENTS

| | | | |
|---|---|---|---|
| 7,085,626 B2 * | 8/2006 | Harrod | F24F 11/0012 165/241 |
| 2013/0066472 A1 | 3/2013 | Harrod et al. | |

OTHER PUBLICATIONS

International Preliminary Report of corresponding PCT Application No. PCT/JP2015/052215 dated Aug. 18, 2016.

* cited by examiner

AIR CONDITIONING SYSTEM WITH HEAT PUMP SECTION AND SEPARATE HEAT SOURCE SECTION

CROSS-REFERENCE TO RELATED APPLICATIONS

This U.S. National stage application claims priority under 35 U.S.C. §119(a) to Japanese Patent Application No. 2014-018777, filed in Japan on Feb. 3, 2014, the entire contents of which are hereby incorporated herein by reference.

TECHNICAL FIELD

The present invention relates to an air conditioning system, and particularly relates to an air conditioning system having a heat pump section for performing indoor air-warming by using a vapor-compression refrigeration cycle, and a separate heat source section for performing indoor air-warming by using a heat source separate from the heat pump section.

BACKGROUND ART

In the past, there have been air conditioning systems which have a heat pump section for performing indoor air-warming by using a vapor-compression refrigeration cycle, and a separate heat source section for performing indoor air-warming by using a gas furnace which is a heat source separate from the heat pump section. An example of such an air conditioning system is one in which an air-warming operation by the heat pump section (referred to below as the "heat pump air-warming operation") is switched to an air-warming operation by the separate heat source section (referred to below as the "separate heat source air-warming operation") as an outside air temperature drops, and the separate heat source air-warming operation is switched to the heat pump air-warming operation as the outside air temperature rises, as is indicated in Japanese Laid-open Patent Application No. 64-54160.

SUMMARY

With the method of switching from the separate heat source air-warming operation to the heat pump air-warming operation in the aforementioned Japanese Laid-open Patent Application No. 64-54160, there is a risk of an indoor temperature temporarily dropping and the a comfort level being impaired because the heat pump air-warming operation takes time to take effect.

An object of the present invention is to suppress the temporary drop in the indoor temperature and the impairment of the comfort level when the operation is switched from the separate heat source air-warming operation to the heat pump air-warming operation in the air conditioning system comprising the heat pump section and the separate heat source section.

An air conditioning system according to a first aspect has a heat pump section for performing indoor air-warming by using a vapor-compression refrigeration cycle, a separate heat source section for performing indoor air-warming by using a heat source separate from the heat pump section, and a control unit for controlling actions of the heat pump section and the separate heat source section. In this aspect, when an operation is switched from a separate heat source air-warming operation for performing indoor air-warming by using the separate heat source section to a heat pump air-warming operation for performing indoor air-warming by using the heat pump section, the control unit starts the heat pump air-warming operation while the separate heat source air-warming operation is continued, and after an overlapping air-warming ending condition is met, the control unit ends the separate heat source air-warming operation.

In this aspect, when the operation switches from the separate heat source air-warming operation to the heat pump air-warming operation as described above, it is possible for the separate heat source section to support the air-warming capability deficiency when the heat pump air-warming operation is starting up.

It is thereby possible in this aspect to suppress the temporary drop in indoor temperature and the impairment of the comfort level when the operation switches from the separate heat source air-warming operation to the heat pump air-warming operation.

An air conditioning system according to a second aspect is the air conditioning system according to the first aspect, wherein the heat pump section has a refrigerant heat-radiator for heating an air by radiating a heat of a refrigerant in the refrigeration cycle. The overlapping air-warming ending condition is that a temperature of the air heated by the refrigerant heat-radiator is equal to or greater than an overlapping air-warming ending air temperature.

In the air conditioning system comprising the heat pump section and the separate heat source section, when the heat pump air-warming operation is started while the separate heat source air-warming operation is continued, if the temperature of the air heated by the refrigerant heat-radiator configuring the heat pump section has sufficiently risen, it can be presumed that the air-warming capability of the heat pump section is great enough, i.e., that the heat pump air-warming operation has taken effect.

In view of this, in this aspect, whether or not the heat pump air-warming operation has taken effect is determined on the basis of the temperature of air heated by the refrigerant heat-radiator configuring the heat pump section, as described above.

It is thereby possible in this aspect to appropriately determine whether or not the heat pump air-warming operation has taken effect, and to switch from the separate heat source air-warming operation to the heat pump air-warming operation.

An air conditioning system according to a third aspect is the air conditioning system according to the first aspect, wherein the heat pump section has a refrigerant heat-radiator for heating an air by radiating a heat of a refrigerant in the refrigeration cycle, and the separate heat source section has a separate heat source heat-radiator for heating the air by radiating a heat of a heat source separate from the heat pump section. The air conditioning system further has an indoor air blower for supplying a room with the air heated by both the refrigerant heat-radiator and the separate heat source heat-radiator. The overlapping air-warming ending condition is that an air-warming capability resulting from subtracting an air-warming capability of the separate heat source section from an air-warming capability calculated from a temperature of the air heated by both the refrigerant heat-radiator and the separate heat source heat-radiator and from a flow rate of the air supplied into the room by the indoor air blower is equal to or greater than an overlapping air-warming ending capability.

In this aspect, the air conditioning system employs a configuration in which the room is supplied with the air heated by both the refrigerant heat-radiator configuring the heat pump section and the separate heat source heat-radiator configuring the separate heat source section, as described above. Therefore, when the heat pump air-warming operation is started while the separate heat source air-warming operation is continued, there are cases in which the air-warming capability of the heat pump section is essentially not great enough merely with the air temperature being increased by the air-warming capability of the separate heat source section.

In view of this, in this aspect, whether or not the heat pump air-warming operation has taken effect is determined on the basis of the air-warming capability resulting from subtracting the air-warming capability of the separate heat source section from the air-warming capability calculated from the temperature of the air heated by both the refrigerant heat-radiator and the separate heat source heat-radiator and the flow rate of the air supplied into the room by the indoor air blower, i.e., on the basis of the air-warming capability of the heat pump section, It is thereby possible in this aspect to appropriately determine whether or not the heat pump air-warming operation has taken effect, and to switch from the separate heat source air-warming operation to the heat pump air-warming operation, An air conditioning system according to a fourth aspect is the air conditioning system according to the first aspect, wherein the heat pump section has a refrigerant heat-radiator for heating an air by radiating a heat of a refrigerant in the refrigeration cycle, and the separate heat source section has a separate heat source heat-radiator for heating the air by radiating a heat of a heat source separate from the heat pump section. The overlapping air-warming ending condition is that a temperature of the air heated by both the refrigerant heat-radiator and the separate heat source heat-radiator is equal to or greater than an overlapping air-warming ending air temperature.

In this aspect, the air conditioning system employs a configuration in which the room is supplied with the air heated by both the refrigerant heat-radiator configuring the heat pump section and the separate heat source heat-radiator configuring the separate heat source section, as described above. Therefore, when the heat pump air-warming operation is started while the separate heat source air-warming operation is continued, there are cases in which the air-warming capability of the heat pump section is essentially not great enough merely with the air temperature being increased by the air-warming capability of the separate heat source section. The rise in the air temperature from the air-warming capability of the separate heat source section can be estimated from the temperature of the air heated by the separate heat source heat-radiator when the separate heat source air-warming operation is performed. Therefore, if it is possible to know the temperature of the air heated by both the refrigerant heat-radiator and the separate heat source heat-radiator, it is also possible to estimate the rise in the air temperature caused by the heat pump air-warming operation.

In view of this, in this aspect, whether or not the heat pump air-warming operation has taken effect is determined on the basis of the temperature of the air heated by both the refrigerant heat-radiator and the separate heat source heat-radiator, as described above.

It is thereby possible in this aspect to appropriately determine whether or not the heat pump air-warming operation has taken effect, and to switch from the separate heat source air-warming operation to the heat pump air-warming operation.

An air conditioning system according to a fifth aspect is the air conditioning system according to the first aspect, wherein the overlapping air-warming ending condition is that a temperature difference resulting from subtracting a target indoor temperature from an indoor temperature is equal to or greater than an overlapping air-warming ending air temperature difference.

In the air conditioning system including the heat pump section and the separate heat source section, when the heat pump air-warming operation is started while the separate heat source air-warming operation is continued and the temperature difference resulting from subtracting the target indoor temperature from the indoor temperature is great enough, the total air-warming capability combining the air-warming capability of the heat pump section and the air-warming capability of the separate heat source section is great enough, and it can therefore be presumed that the air-warming capability of the heat pump section is great enough, i.e., that the heat pump air-warming operation has taken effect, In view of this, in this aspect, whether or not the heat pump air-warming operation has taken effect is determined on the basis of the temperature difference resulting from subtracting the target indoor temperature from the indoor temperature.

It is thereby possible in this aspect to appropriately determine whether or not the heat pump air-warming operation has taken effect, and to switch from the separate heat source air-warming operation to the heat pump air-warming operation.

An air conditioning system according to a sixth aspect is the air conditioning system according to the first aspect, wherein the heat pump section has a refrigerant heat-radiator for heating an air by radiating a heat of a refrigerant in the refrigeration cycle, and the separate heat source section has a separate heat source heat-radiator for heating the air by radiating a heat of a heat source separate from the heat pump section. The air conditioning system further has an indoor air blower for supplying a room with the air heated by both the refrigerant heat-radiator and the separate heat source heat-radiator, The separate heat source heat-radiator is disposed on a side upwind from the refrigerant heat-radiator, The overlapping air-warming ending condition is that a temperature of the refrigerant flowing through the refrigerant heat-radiator is equal to or greater than an overlapping air-warming ending heat exchange temperature.

In this aspect, the air conditioning system employs the configuration in which the air heated by the separate heat source heat-radiator configuring the separate heat source section is further heated by the refrigerant heat-radiator configuring the heat pump section, and the air is then supplied into the room, as described above. Therefore, when the heat pump air-warming operation is started while the separate heat source air-warming operation is continued, there are cases in which the temperature of the air heated by the separate heat source heat-radiator is too high, whereby the temperature of the refrigerant heat-radiator configuring the heat pump section, and consequently the refrigeration cycle of the heat pump section, shifts towards too high temperature and too high pressure, and the heat pump section must be protected.

In view of this, in this aspect, the heat pump section is protected on the basis of the temperature of the refrigerant flowing through the refrigerant heat-radiator, as described above.

It is thereby possible in this aspect to suppress the temporary drop in the indoor temperature and the impairment of the comfort level, while protecting the heat pump section, when the operation switches from the separate heat source air-warming operation to the heat pump air-warming operation.

DESCRIPTION OF EMBODIMENTS

An embodiment of an air conditioning system according to the present invention is described below on the basis of the drawings. The specific configuration of the embodiment of the air conditioning system according to the present invention is not limited to the following embodiment or the modifications thereof, and the configuration can be altered within a range that does not deviate from the scope of the invention.

(1) Configuration of Air Conditioning System
<Overall>

Figure 1:
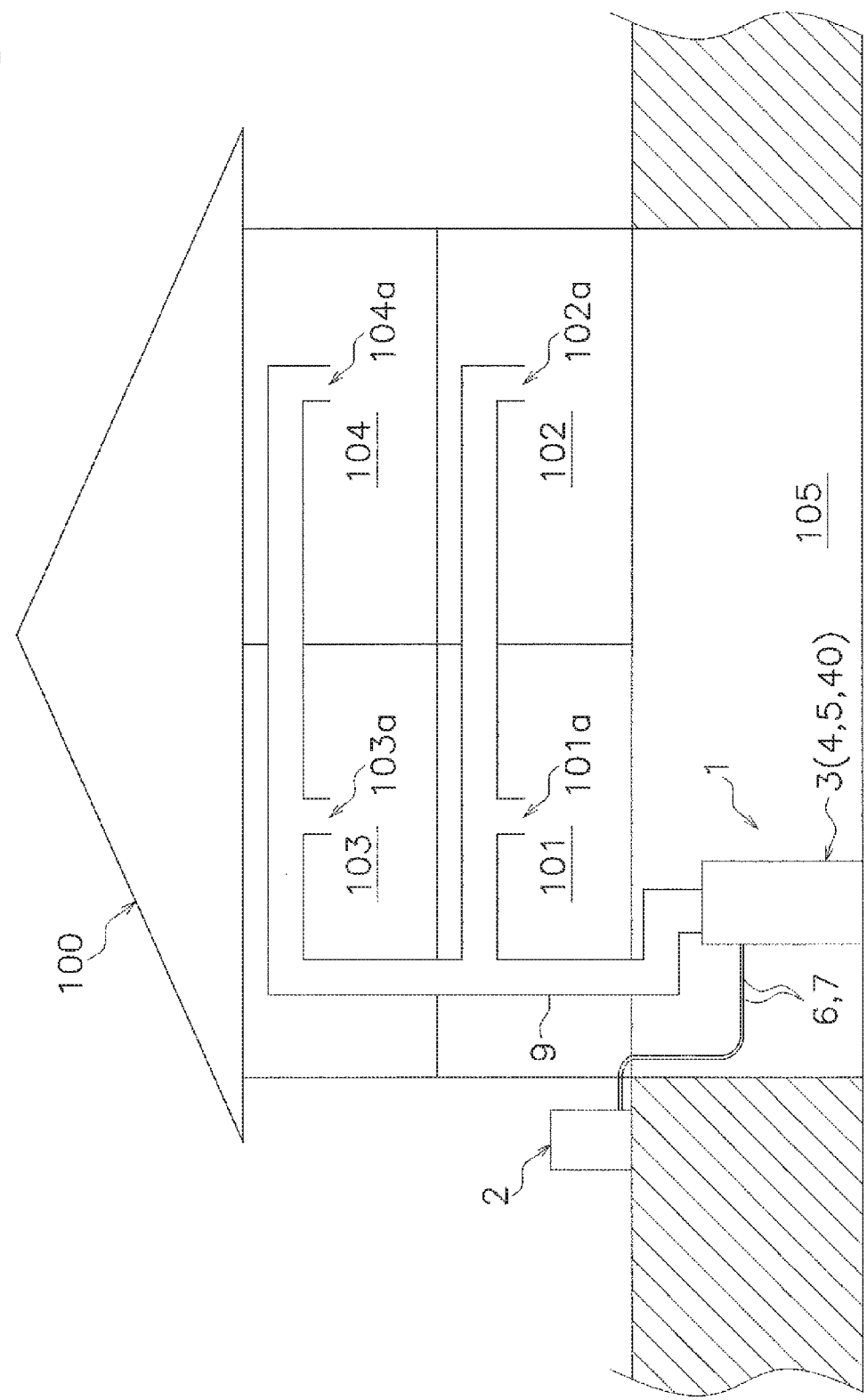
FIG. 1 is a schematic diagram showing the arrangement of an air conditioning system according to an embodiment of the present invention.
Figure 2:
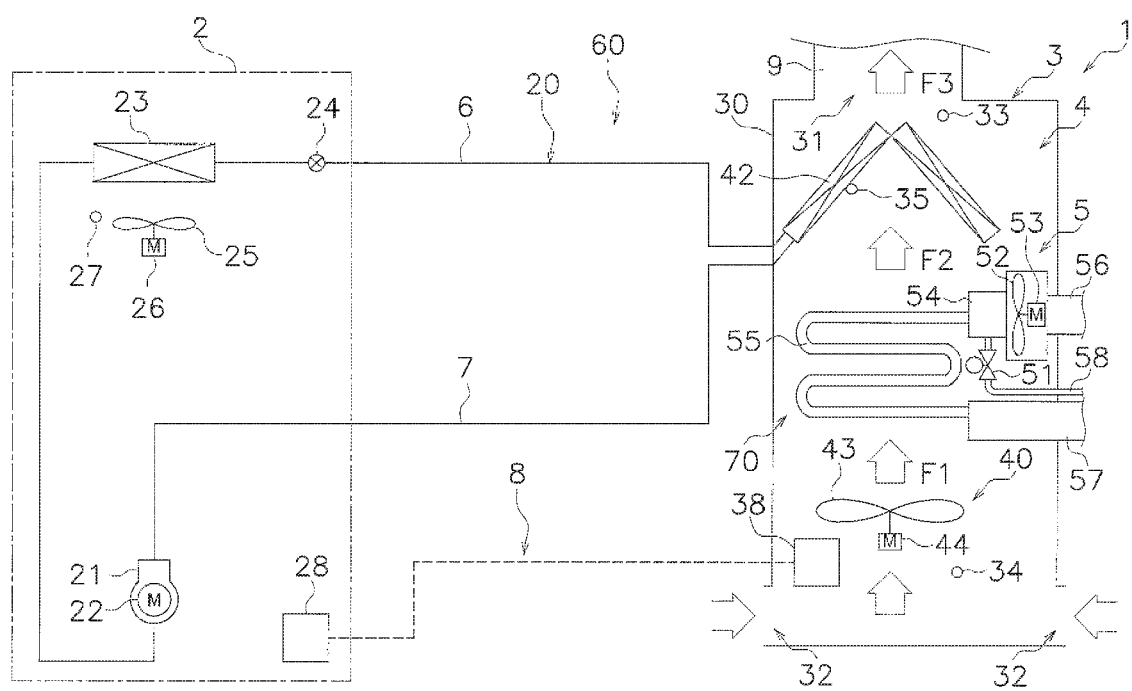
FIG. 2 is a simplified configuration diagram of the air conditioning system.

FIG. 1 is a schematic diagram showing the arrangement of an air conditioning system 1 according to an embodiment of the present invention. FIG. 2 is a simplified schematic diagram of the air conditioning system 1. The air conditioning system 1 is an apparatus used to air-condition a residence or a building. The air conditioning system 1 in this embodiment is installed in a two-story residence 100. The residence 100 has rooms 101, 102 on the first floor and rooms 103, 104 on the second floor. The residence 100 also has a basement 105.

The air conditioning system 1 is a so-called duct-type air conditioning system. The air conditioning system 1 has primarily an outdoor unit 2, a usage unit 3, refrigerant interconnection pipes 6, 7 connecting the outdoor unit 2 and the usage unit 3, and a duct 9 for sending air conditioned by the usage unit 3 to the rooms 101 to 104. The duct 9 is branched into the rooms 101 to 104 and is connected to ventilation ports 101a to 104a of the rooms 101 to 104.

In this embodiment, the outdoor unit 2, an indoor unit 4 which is part of the usage unit 3, and the refrigerant interconnection pipes 6, 7 configure a heat pump section 60 for performing indoor air-warming using by a vapor-compression refrigeration cycle. A gas furnace unit 5, which is part of the usage unit 3, configures a separate heat source section 70 for performing indoor air-warming using by a heat source (heat from gas combustion in this embodiment) separate from the heat pump section 60. Thus, in this embodiment, the usage unit 3 has bath the indoor unit 4 configuring the heat pump section 60 and the gas furnace unit 5 configuring the separate heat source section 70. The usage unit 3 also has an indoor air blower 40 for taking the air in the rooms 101 to 104 into a housing 30 of the usage unit 3, and supplying air conditioned by the heat pump section 60 (the indoor unit 4) and/or the separate heat source section 70 (the gas furnace unit 5) to the rooms 101 to 104. The usage unit 3 is also provided with a discharged air temperature sensor 33 for detecting a discharged air temperature Trd, which is the temperature of the air in an air outlet 31 of the housing 30, and an indoor temperature sensor 34 for detecting indoor temperature Tr, which is the temperature of the air in an air inlet 32 of the housing 30, The indoor temperature sensor 34 may be provided within the rooms 101 to 104 rather than in the usage unit 3.

<Heat Pump Section>

The heat pump section 60, as described above, is configured from the outdoor unit 2, the indoor unit 4 which is part of the usage unit 3, and the refrigerant interconnection pipes 6, 7. In this embodiment, the outdoor unit 2 and the indoor unit 4 are connected via the refrigerant interconnection pipes 6, 7. Specifically, in the heat pump section 60, a refrigerant circuit 20 is configured by the outdoor unit 2 and the indoor unit 4 being connected via the refrigerant interconnection pipes 6, 7 In this embodiment, the refrigerant interconnection pipes 6, 7 are refrigerant pipes constructed on-site when the air conditioning system 1 is installed.

The indoor unit 4 in this embodiment is provided inside the housing 30 of the usage unit 3 installed in the basement 105 of the residence 100. The indoor unit 4, which is connected to the outdoor unit 2 via the refrigerant interconnection pipes 6, 7, constitutes part of the refrigerant circuit 20. The indoor unit 4 has primarily an indoor heat exchanger 42 as a refrigerant heat-radiator for heating air by radiating the heat of the refrigerant in the refrigeration cycle. In this embodiment, the indoor heat exchanger 42 is disposed on the farthest downwind side in the ventilation path from the air inlet 32 to the air outlet 31 formed in the housing 30 of the usage unit 3. The indoor unit 4 is also provided with an indoor heat exchange temperature sensor 35 for detecting the temperature Thx of refrigerant flowing through the indoor heat exchanger 42.

The outdoor unit 2 is installed outside of the residence 100. The outdoor unit 2, which is connected to the indoor unit 4 via the refrigerant interconnection pipes 6, 7, configures part of the refrigerant circuit 20. The outdoor unit 2 has primarily a compressor 21, an outdoor heat exchanger 23, and an outdoor expansion valve 24. The compressor 21 is a hermetic compressor in which a compression element (not shown) and a compressor motor 22 for rotatably driving the compression element are accommodated within a casing. The compressor motor 22 is designed so that electric power is supplied via an inverter device (not shown), and the operating capacity can be varied by changing the frequency (i.e., the rotational speed) of the inverter device. The outdoor heat exchanger 23 is a heat exchanger that functions as a refrigerant evaporator which uses outdoor air to evaporate refrigerant in the refrigerant cycle. Provided in proximity to the outdoor heat exchanger 23 is an outdoor fan 25 for sending outdoor air to the outdoor heat exchanger 23. The outdoor fan 25 is designed so as to be rotatably driven by an outdoor fan motor 26. The outdoor expansion valve 24 is a valve which depressurizes the refrigerant circulating through the refrigerant circuit 20, and adjusts the flow rate of refrigerant flowing through the indoor heat exchanger 42 as a refrigerant heat-radiator. In this embodiment, the outdoor expansion valve 24 is an electric expansion valve connected to the liquid side of the outdoor heat exchanger 23. The outdoor unit 2 is also provided with an outdoor temperature sensor 27 for detecting the temperature of outdoor air outside of the residence 100 where the outdoor unit 2 is disposed, i.e., the outside air temperature Ta. The outdoor unit 2 also has an outdoor-side control unit 28 for controlling the actions of the components configuring the outdoor unit 2. The outdoor-side control unit 28, which has a microcomputer provided in order to control the outdoor unit 2, an inverter device which controls a memory and/or the compressor motor 22, and other components, is designed to be able to exchange control signals and the like with a usage-side control unit 38 of the usage unit 3.

<Separate Heat Source Section>

The separate heat source section 70, as described above, is configured from the gas furnace unit 5 which is part of the usage unit 3.

The gas furnace unit 5 in this embodiment is provided within the housing 30 of the usage unit 3 disposed in the basement 105 of the residence 100, In this embodiment, the gas furnace unit 5 is a gas combustion type air-warming apparatus, having primarily a fuel gas valve 51, a furnace fan 52, a combustion section 54, a furnace heat exchanger 55, an air-feeding pipe 56, and an exhaust pipe 57. The fuel gas valve 51, composed of an electromagnetic valve or the like of which the opening and closing can be controlled, is provided to a fuel gas supply pipe 58 extending to the combustion section 54 from outside of the housing 30. In this embodiment, natural gas, petroleum gas, or the like is used as the fuel gas. The furnace fan 52 is a fan which takes air into the combustion section 54 through the air-feeding pipe 56, then sends the air to the furnace heat exchanger 55, and creates an air flow which is discharged from the exhaust pipe 57. The furnace fan 52 is designed so as to be rotatably driven by a furnace fan motor 53. The combustion section 54 is a device which obtains high-temperature combustion gas, by combustion of a mixed gas of fuel gas and air by using a gas burner or the like (not shown). The furnace heat exchanger 55, which is a heat exchanger for heating air by radiating the heat of the combustion gas obtained by the combustion section 54, functions as a separate heat source heat-radiator for heating air by radiating the heat of a heat source (heat from gas combustion in this embodiment) that is separate from the heat pump section 60. In this embodiment, the furnace heat exchanger 55 is disposed within the ventilation path from the air inlet 32 to the air outlet 31 formed in the housing 30 of the usage unit 3, on the side upwind from the indoor heat exchanger 42 as a refrigerant heat-radiator.

<Indoor Air Blower>

The indoor air blower 40, as described above, is an air blower for supplying the rooms 101 to 104 with air heated by the indoor heat exchanger 42 as a refrigerant heat-radiator configuring the heat pump section 60, and/or by the furnace heat exchanger 55 as a separate heat source heat-radiator configuring the separate heat source section 70. In this embodiment, the indoor air blower 40 is disposed within the ventilation path from the air inlet 32 to the air outlet 31 formed in the housing 30 of the usage unit 3, on the side upwind from both the indoor heat exchanger 42 and the furnace heat exchanger 55. The indoor air blower 40 has an indoor fan 43 and an indoor fan motor 44 for rotatably driving the indoor fan 43.

<Control Unit>

The usage unit 3 has the usage-side control unit 38 for controlling the actions of the components (the indoor unit 4, the gas furnace unit 5, and the indoor air blower 40) configuring the usage unit 3. The usage-side control unit 38 has a microcomputer, a memory, and other components provided in order to control the usage unit 3, and this control unit is designed to be able to exchange control signals and the like with the outdoor unit 2.

Figure 3:
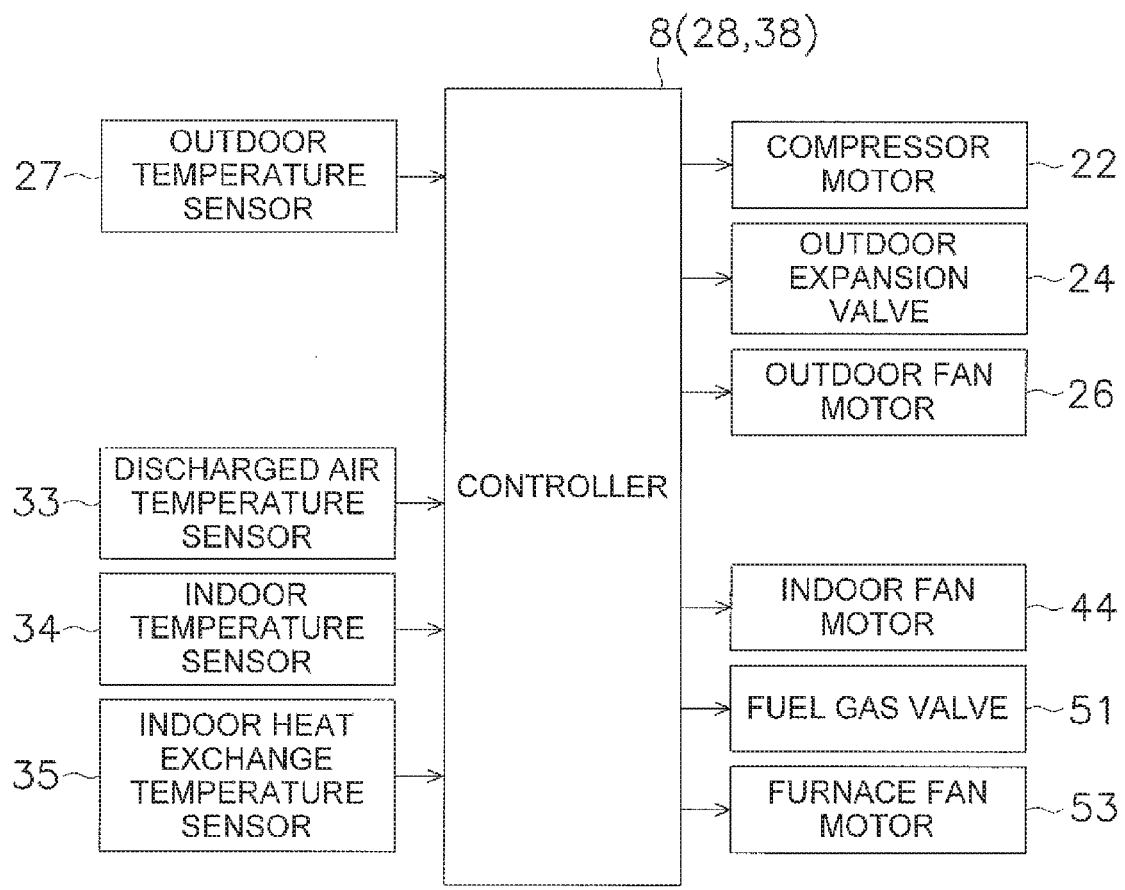
FIG. 3 is a control block diagram of the air conditioning system.

The usage-side control unit 38 of the usage unit 3 and the outdoor-side control unit 28 of the outdoor unit 2 configure a control unit 8 for performing operation control on the entire air conditioning system 1, as shown in FIG. 2. The control unit 8 is connected so as to be able to receive detection signals from the various sensors 27, 33, 34, 35, etc., as shown in FIG. 3. The control unit 8 is configured no as to perform an air-conditioning operation (an air-warming operation) by controlling the various devices and valves 22, 24, 26, 44, 51, 53, i.e., by controlling the actions of the heat pump section 60 and the separate heat source section 70, on the basis of these detection signals and the like. In this embodiment, the control unit 8 performs control no that the indoor temperature Tr in the rooms 101 to 104 reaches a target indoor temperature Trs, while switching as appropriate between a heat pump air-warming operation in which air-warming in the rooms 101 to 104 is performed by the heat pump section 60, and a separate heat source air-warming operation in which air-warming in the rooms 101 to 104 is performed by the separate heat source section 70. FIG. 3 in this case is a control block diagram of the air conditioning system 1.

(2) Basic Actions of Air Conditioning System

Next, FIGS. 1 to 3 are used to describe the basic actions of the air-conditioning operation (the air-warming operation) of the air conditioning system 1. As described above, the air-warming operation of the air conditioning system 1 includes a heat pump air-warming operation in which indoor air-warming is performed by the heat pump section 60, and a separate heat source air-warming operation in which indoor air-warming is performed by the separate heat source section 70, as described above.

<Heat Pump Air-Warming Operation>

In the heat pump air-warming operation, the refrigerant in the refrigerant circuit 20 is drawn into the compressor 21 and compressed to a high-pressure gas refrigerant. This high-pressure gas refrigerant is sent from the outdoor unit 2 to the indoor unit 4 of the usage unit 3, via the gas refrigerant interconnection pipe 7.

The high-pressure gas refrigerant sent to the indoor unit 4 of the usage unit 3 is sent to the indoor heat exchanger 42 as a refrigerant heat-radiator. The high-pressure gas refrigerant sent to the indoor heat exchanger 42 is condensed to a high-pressure liquid refrigerant in the indoor heat exchanger 42 by being cooled by heat exchange with indoor air F1 (F2) supplied by the indoor air blower 40. This high-pressure liquid refrigerant is sent from the indoor unit 4 of the usage unit 3 to the outdoor unit 2, via the liquid refrigerant interconnection pipe 6. Indoor air F3 heated in the indoor heat exchanger 42 is sent from the usage unit 3 through the duct 9 to the rooms 101 to 104, and air-warming is performed.

The high-pressure liquid refrigerant sent to the outdoor unit 2 is sent to the outdoor expansion valve 24 and is depressurized by the outdoor expansion valve 24 to a low-pressure gas-liquid two-phase refrigerant. This low-pressure gas-liquid two-phase refrigerant is sent to the outdoor heat exchanger 23 as a refrigerant evaporator. The low-pressure gas-liquid two-phase refrigerant sent to the outdoor heat exchanger 23 is evaporated to a low-pressure gas refrigerant in the outdoor heat exchanger 23 by being heated by heat exchange with outdoor air supplied by the outdoor fan 25. This low-pressure gas refrigerant is again drawn into the compressor 21.

In the heat pump air-warming operation described above, the control unit 8 performs control so that the indoor temperature Tr in the rooms 101 to 104 reaches the target indoor temperature Trs, either by controlling the operating capacity Gr of the compressor 21 or by controlling the opening degree MV of the outdoor expansion valve 24. Specifically, when a temperature difference ΔTr, which is resulting from subtracting the target indoor temperature Trs from the indoor temperature Tr, is large, the operating capacity Gr of the compressor 21 (e.g., the rotational speed of the compressor motor 22) is increased and the opening degree MV of the outdoor expansion valve 24 is increased. Specifically the control unit 8 performs control which increases the operating capacity Gr of the compressor 21 and increases the opening degree MV of the outdoor expansion valve 24 when the temperature difference ΔTr, which is resulting from subtracting the target indoor temperature Trs from the indoor temperature Tr, is large, and reduces the operating capacity Gr of the compressor 21 and reduces the opening degree MV of the outdoor expansion valve 24 when the temperature difference ΔTr is small.

<Separate Heat Source Air-Warming Operation>

In the separate heat source air-warming operation, fuel gas is supplied to the combustion section 54 by opening the fuel gas valve 51, the fuel gas in the combustion section 54 mixes with air taken into the gas furnace unit 5 of the usage unit 3 via the air-feeding pipe 56 by the furnace fan 52, the fuel gas ignites and thereby combusts, and a high-temperature combustion gas is produced.

The high-temperature combustion gas produced in the combustion section 54 is sent to the furnace heat exchanger 55 as a separate heat source heat-radiator. The high-temperature combustion gas sent to the furnace heat exchanger 55 is cooled to a low-temperature combustion gas in the furnace heat exchanger 55 by heat exchange with the indoor air F1 supplied by the indoor air blower 40. This low-temperature combustion gas is discharged from the gas furnace unit 5 of the usage unit 3 via the exhaust pipe 57. On the other hand, the indoor air F2 (F3) heated in the furnace heat exchanger 55 is sent from the usage unit 3 through the duct 9 to the rooms 101 to 104, and air-warming is performed.

In the separate heat source air-warming operation described above, the control unit 8 performs control so that the indoor temperature Tr in the rooms 101 to 104 reaches the target indoor temperature Trs, by controlling the opening and closing of the fuel gas valve 51. Specifically, the control unit 8 performs control which opens the fuel gas valve 51 when the temperature difference ΔTr, which is resulting from subtracting the target indoor temperature Trs from the indoor temperature Tr, increases, and closes the fuel gas valve 51 when the temperature difference ΔTr decreases.

(3) Action of Switching Between Heat Pump Air-Warming Operation and Separate Heat Source Air-Warming Operation <Basic Switching Action>

In the air conditioning system 1, there are cases in which the air-conditioning load (the air-warming load) in the rooms (the rooms 101 to 104 in this embodiment) cannot be covered by the heat pump air-warming operation when the outside air temperature Ta is extremely low, and it is therefore necessary to perform the actions to switch the heat pump air-warming operation to the separate heat source air-warming operation as the outside air temperature Ta falls, and to switch the separate heat source air-warming operation to the heat pump air-warming operation as the outside air temperature Ta rises.

In view of this, in this embodiment, the basic switching action is that when the heat pump air-warming operation is being performed and a first switching condition is met which is that the outside air temperature Ta reaches a first switching outside air temperature Tas1, the operation is switched from the heat pump air-warming operation to the separate heat source air-warming operation, and when the separate heat source air-warming operation is being performed and a second switching condition is met which is that the outside air temperature Ta reaches a second switching outside air temperature Tas2, the operation is switched from the separate heat source air-warming operation to the heat pump air-warming operation.

Figure 4:
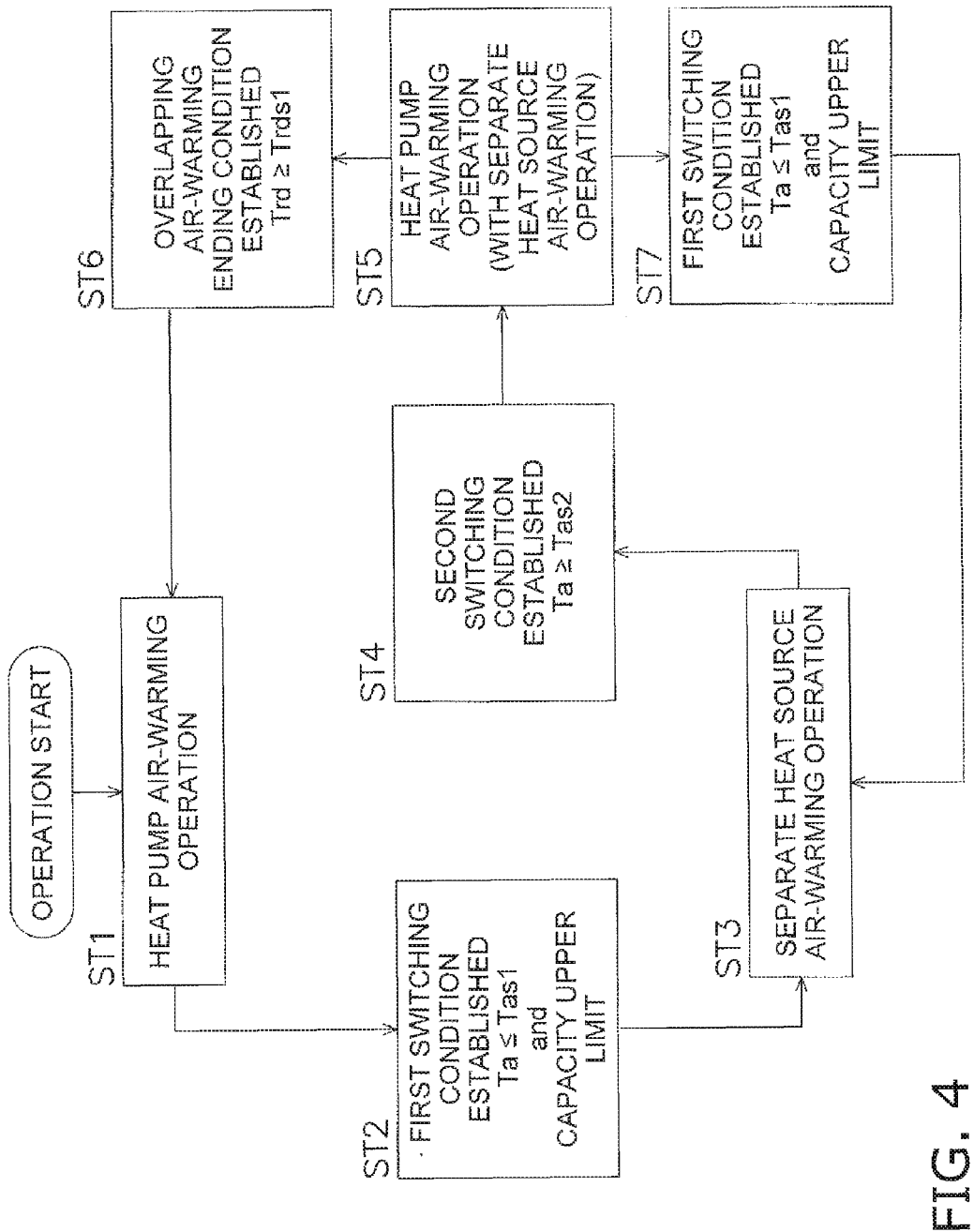
FIG. 4 is a flowchart showing actions of switching between a heat pump air-warming operation and a separate heat source air-warming operation.

Next, FIGS. 1 to 4 are used to describe the basic switching action. In this embodiment, FIG. 4 is a flowchart showing the action of switching between the heat pump air-warming operation and the separate heat source air-warming operation. The action of switching between the heat pump air-warming operation and the separate heat source air-warming operation is performed by the control unit 8.

Specifically, first, when the operation of the air conditioning system 1 starts, the heat pump air-warming operation of step ST1 is performed. During the heat pump air-warming operation of step ST1, a determination is made as to whether or not the first switching condition of step ST2 is met. This first switching condition is a condition for determining whether or not to switch from the heat pump air-warming operation to the separate heat source air-warming operation. In this embodiment, in addition to the outside air temperature Ta in the heat pump air-warming operation being equal to or less than the first switching outside air temperature Tas1, another part of the determination condition is that the air-warming capability of the heat pump section 60 has reached an upper limit, in order to ensure that the level of comfort and energy conservation can be improved with an appropriate switching timing. In other words, in this embodiment, the first switching condition is that the outside air temperature Ta reaches the first switching outside air temperature Tas1 and the air-warming capability of the heat pump section 60 reaches the upper limit. Whether or not the air-warming capability of the heat pump section 60 has reached the upper limit is determined on the basis of the indoor temperature Tr and/or the operating capacity of the devices (the compressor 21 and/or the outdoor expansion valve 24 in this case) configuring the heat pump section 60. The first switching condition may also be solely a condition of the outside air temperature Ta.

When it is determined in step ST2 that the first switching condition is met, the sequence transitions to the process of step ST3, i.e., the operation switches from the heat pump air-warming operation to the separate heat source air-warming operation. When it is determined in step ST2 that the first switching condition is not met, the heat pump air-warming operation of step ST1 is continued.

Next, in the separate heat source air-warming operation of step ST3, a determination is made as to whether or not the second switching condition of step ST4 is met. This second switching condition is a condition for determining whether or not to switch from the separate heat source air-warming operation to the heat pump air-warming operation. In this embodiment, the condition is that the outside air temperature Ta during the separate heat source air-warming operation is equal to or greater than the second switching outside air temperature Tas2.

When it is determined in step ST4 that the second switching condition is met, the sequence transitions to the process of ST1, i.e., the operation switches from the separate heat source air-warming operation to the heat pump air-warming operation, via the action of starting the heat pump air-warming operation while the separate heat source air-warming operation is continued (steps ST5, ST6) as described hereinafter. When it is determined in step ST4 that the second switching condition is not met, the separate heat source air-warming operation of step ST3 is continued.

<Detailed Action When Switching From Separate Heat Source Air-Warming Operation to Heat Pump Air-Warming Operation>

In the basic switching action described above, when the operation switches from the separate heat source air-warming operation to the heat pump air-warming operation, because it takes time for the heat pump air-warming operation to take effect, there is a risk that the indoor temperature Tr will temporarily fall and the level of comfort will be impaired.

In view of this, in this embodiment, to suppress the temporary drop in indoor temperature and the impairment of the comfort level when the operation switches from the separate heat source air-warming operation to the heat pump air-warming operation, the heat pump air-warming operation is started while the separate heat source air-warming operation is continued, and the separate heat source air-warming operation is ended after an overlapping air-warming ending condition has been met.

Next is a description of the detailed action when the operation switches from the separate heat source air-warming operation to the heat pump air-warming operation.

Specifically, first, when it is determined in step ST4 that the second switching condition is met, the sequence transitions to the process of step ST5, and the heat pump air-warming operation is started while the separate heat source air-warming operation is continued. It is thereby possible for the separate heat source section 70 to support the air-warming capability deficiency when the heat pump air-warming operation is starting up. During the heat pump air-warming operation accompanying the separate heat source air-warming operation of step ST5, a determination is made as to whether or not the overlapping air-warming ending condition of step ST6 is met, as is a determination as to whether or not the first switching condition of step ST7 is met.

The determination in step ST7 of whether or not the first switching condition is met is the same determination content as the determination in step ST2 of whether or not the first switching condition is met, and when it is determined that the first switching condition is met during the heat pump air-warming operation accompanying the separate heat source air-warming operation of step ST5, the sequence transitions to the process of step ST3, i.e., operation does not transition to the heat pump air-warming operation of step ST1 but returns to the separate heat source air-warming operation, and a determination is again made as to whether or not the second switching condition of step ST4 is met.

The overlapping air-warming ending condition of step ST6 is a condition for determining whether or not to end the separate heat source air-warming operation, i.e., whether or not the heat pump air-warming operation has taken effect. In this embodiment, the overlapping air-warming ending condition is that the temperature Trd of the air that has been heated by the indoor heat exchanger 42 as a refrigerant heat-radiator is equal to or greater than an overlapping air-warming ending air temperature Trds1. The reason this condition is employed is because when the heat pump air-warming operation is started while the separate heat source air-warming operation is continued, if the temperature Trd of the air that has been heated by the indoor heat exchanger 42 as a refrigerant heat-radiator configuring the heat pump section 60 has sufficiently risen, it can be presumed that the air-warming capability Qa of the heat pump section 60 is great enough, i.e., that the heat pump air-warming operation has taken effect.

Thus, in this embodiment, a determination is made as to whether or not the heat pump air-warming operation has taken effect on the basis of the temperature Trd of the air that has been heated by the indoor heat exchanger 42 as a refrigerant heat-radiator configuring the heat pump section 60.

When it is determined in step ST6 that the overlapping air-warming ending condition is met, the sequence transitions to the process of step ST1, i.e., to the heat pump air-warming operation.

It is thereby possible in this embodiment to suppress the temporary drop in the indoor temperature Tr and the impairment of the comfort level when the operation switches from the separate heat source air-warming operation to the heat pump air-warming operation. It is also possible in this embodiment to appropriately determine whether or not the heat pump air-warming operation has taken effect, and to switch from the separate heat source air-warming operation to the heat pump air-warming operation.

(4) Modifications

<A>

The overlapping air-warming ending condition of step ST6 in the above embodiment is not limited to the condition of the above embodiment.

Figure 5:
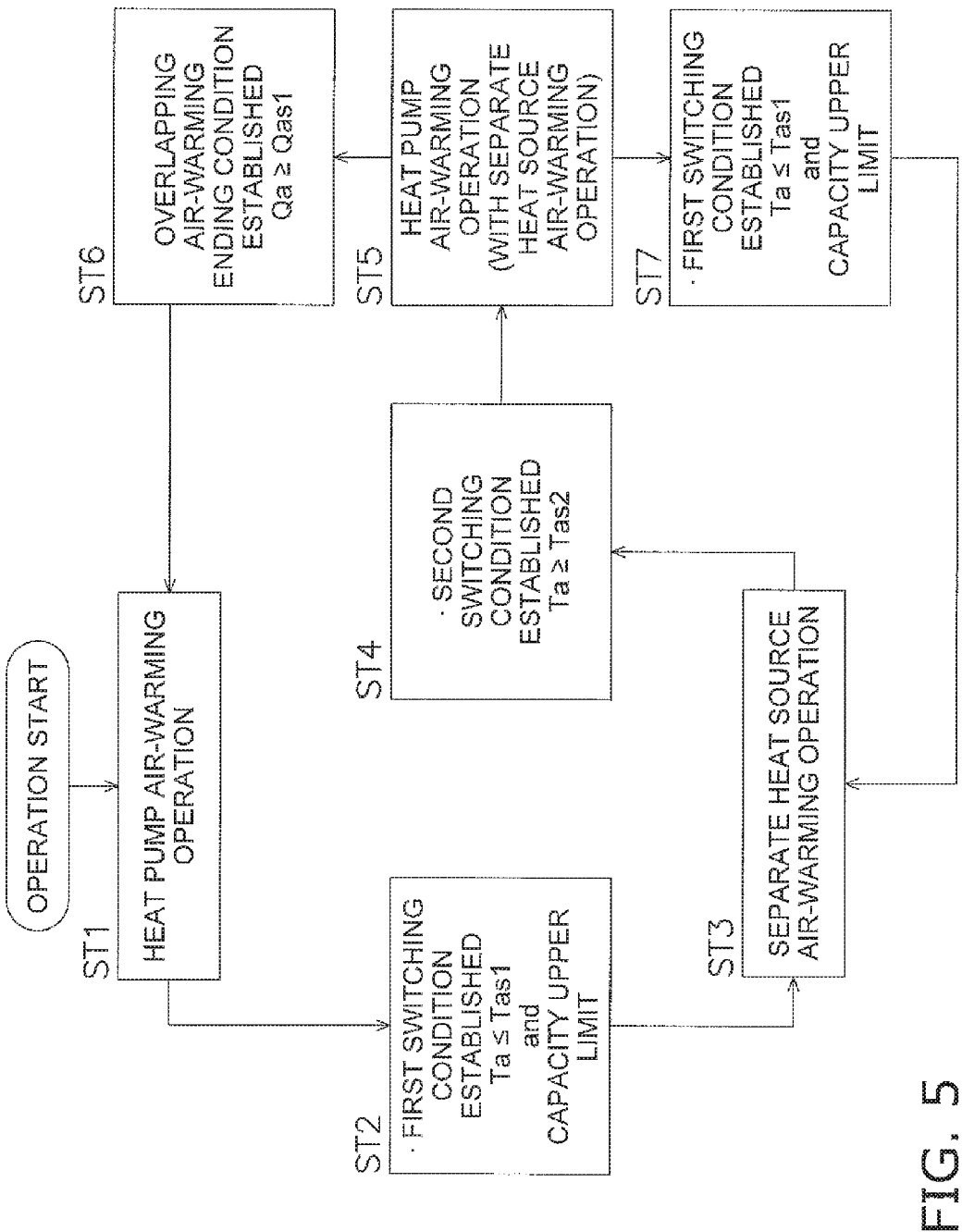
FIG. 5 is a flowchart showing the actions of switching between the heat pump air-warming operation and the separate heat source air-warming operation, according to Modification <A>.

For example, the control unit 8 may determine if the air-warming capability Qa is equal to or greater than an overlapping air-warming ending capability Qas1 as the overlapping air-warming ending condition in step ST6, as shown in FIG. 5, the air-warming capability Qa being resulted from subtracting the air-warming capability Qg of the separate heat source section 70 from an air-warming capability Qt, which is calculated from the temperature Trd of the air heated by both the indoor heat exchanger 42 as a refrigerant heat-radiator and the furnace heat exchanger 55 as a separate heat source heat-radiator, and from the flow rate Ga of air supplied into the rooms by the indoor air blower 40. The reason this condition is employed is because when the heat pump air-warming operation is started while the separate heat source air-warming operation is continued, there are cases in which the air-warming capability Qa of the heat pump section 60 is essentially not great enough merely with the air temperature Trd being increased by the air-warming capability Qg of the separate heat source section 70. In this modification, the heat exchange quantity in both the indoor heat exchanger 42 and the furnace heat exchanger 55 (i.e., the total air-warming capability Qt of the heat pump section 60 and the separate heat source section 70) is calculated by subtracting the indoor air temperature Tr, which is the temperature before the air is heated by both the indoor heat exchanger 42 as a refrigerant heat-radiator and the furnace heat exchanger 55 as a separate heat source heat-radiator, from the air temperature Trd, which is the temperature after the air has been heated by both the indoor heat exchanger 42 as a refrigerant heat-radiator and the furnace heat exchanger 55 as a separate heat source heat-radiator, and multiplying the resulting temperature difference by the indoor air flow rate Ga calculated from parameters such as the rotational speed of the indoor fan motor 44 of the indoor air blower 40. By assuming the air-warming capability Qg of the separate heat source section 70 to be a constant air-warming capability and subtracting the air-warming capability Qg of the separate heat source section 70 from the air-warming capability Qt, the air-warming capability Qa of the heat pump section 60 is calculated and it is determined whether or not this air-warming capability Qa is equal to or greater than the overlapping air-warming ending capability Qas1.

Thus, in this modification, a determination is made as to whether or not the heat pump air-warming operation has taken effect on the basis of the air-warming capability Qa, which is resulted from subtracting the air-warming capability Qg of the separate heat source section 70 from the air-warming capability Qt, which calculated from the temperature Trd of the air heated by both the indoor heat exchanger 42 as a refrigerant heat-radiator and the furnace heat exchanger 55 as a separate heat source heat-radiator, and from the flow rate Ga of air supplied into the rooms by the indoor air blower 40; i.e., on the basis of the air-warming capability Qa of the heat pump section 60. It is possible with this determination method as well to appropriately determine whether or not the heat pump air-warming operation has taken effect, and to switch from the separate heat source air-warming operation to the heat pump air-warming operation.

<B>

The overlapping air-warming ending condition of step ST6 in the above embodiment is not limited to the conditions of the above embodiment or modification thereof.

Figure 6:
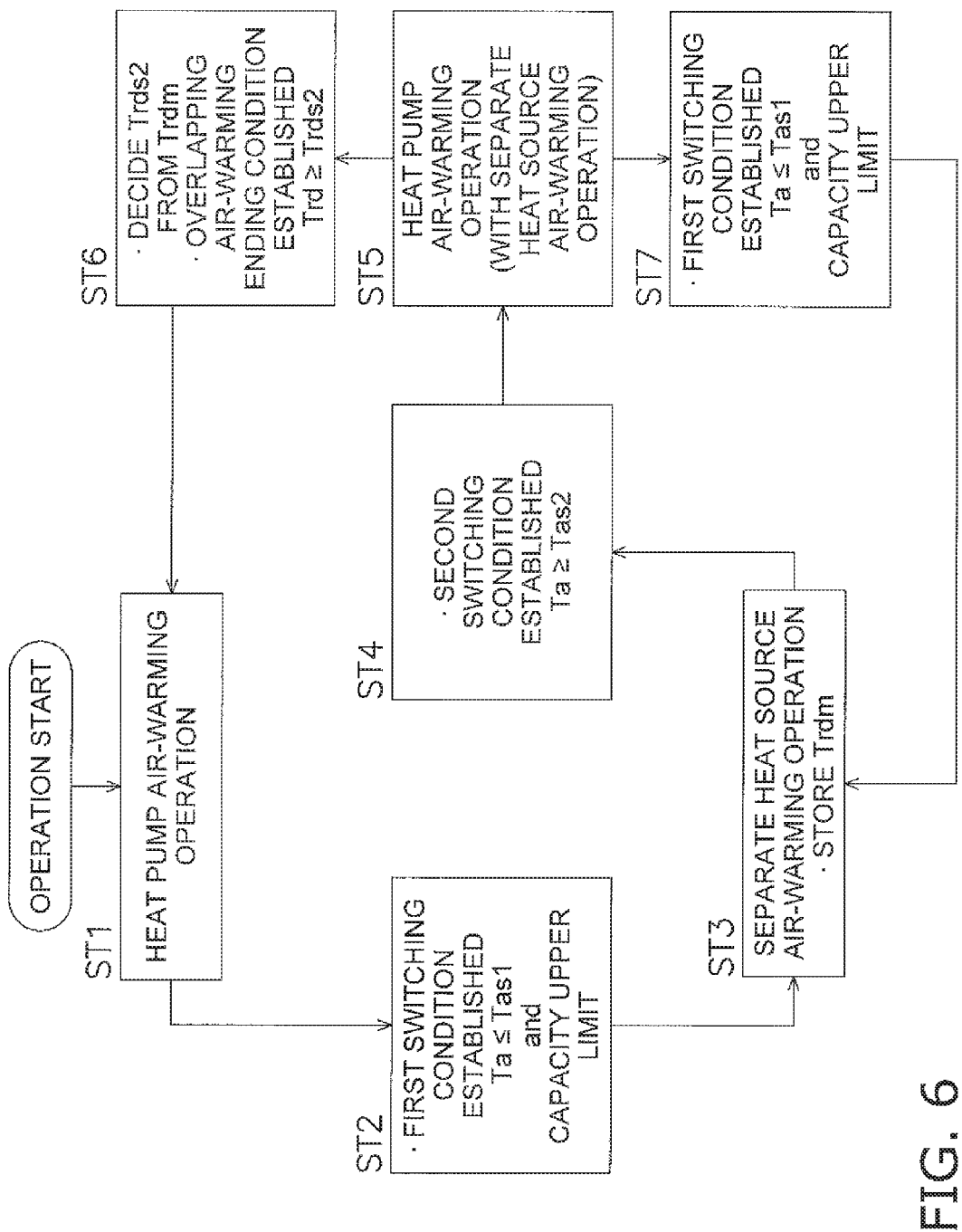
FIG. 6 is a flowchart showing the actions of switching between the heat pump air-warming operation and the separate heat source air-warming operation, according to Modification <B>.

For example, during the separate heat source air-warming operation of step ST3, the control unit 8 stores the temperature Trdm of air that has been heated by the furnace heat exchanger 55 as a separate heat source heat-radiator as shown in FIG. 6, and from this air temperature Trdm estimates the rise ΔTg in air temperature caused by the air-warming capability Qg of the separate heat source section 70. In step ST6, this air temperature rise ΔTg is taken into account to decide an overlapping air-warming ending air temperature Trds2, and the overlapping air-warming ending condition may be that the air temperature Trd, which is the temperature of the air heated by both the indoor heat exchanger 42 as a refrigerant heat-radiator and the furnace heat exchanger 55 as a separate heat source heat-radiator, is equal to or greater than this overlapping air-warming ending air temperature Trds2. The reason this condition is employed in this modification is because when the heat pump air-warming operation is started while the separate heat source air-warming operation is continued, there are cases in which the air-warming capability Qa of the heat pump section 60 is essentially not great enough merely with the air temperature Trd. being increased by the air-warming capability Qg of the separate heat source section 70. In this modification, the rise ΔTg in the air temperature Trd caused by the air-warming capability Qg of the separate heat source section 70 can be estimated from the temperature (the temperature Trdm in this case) of the air heated by the furnace heat exchanger 55 as a separate heat source heat-radiator when the separate heat source air-warming operation is performed, as described above. Therefore, if it is possible to know the temperature Trd of the air heated by both the indoor heat exchanger 42 as a refrigerant heat-radiator and the furnace heat exchanger 55 as a separate heat source heat-radiator, it is also possible to estimate the rise in air temperature caused by the heat pump air-warming operation.

Thus, in this modification, whether or not the heat pump air-warming operation has taken effect is determined on the basis of the temperature Trd of the air heated by both the indoor heat exchanger 42 as a refrigerant heat-radiator and the furnace heat exchanger 55 as a separate heat source heat-radiator. More specifically, whether or not the heat pump air-warming operation has taken effect is determined on the basis of the temperature Trdm of air that has been heated by the furnace heat exchanger 55 as a separate heat source heat-radiator when the separate heat source air-warming operation is performed, and also on the basis of the temperature Trd of the air heated by both the indoor heat exchanger 42 as a refrigerant heat-radiator and the furnace heat exchanger 55 as a separate heat source heat-radiator. It is possible with this determination method as well to appropriately determine whether or not the heat pump air-warming operation has taken effect, and to switch from the separate heat source air-warming operation to the heat pump air-warming operation,

<C>

The overlapping air-warming ending condition of step ST6 in the above embodiment is not limited to the conditions of the above embodiment or the modifications thereof.

Figure 7:
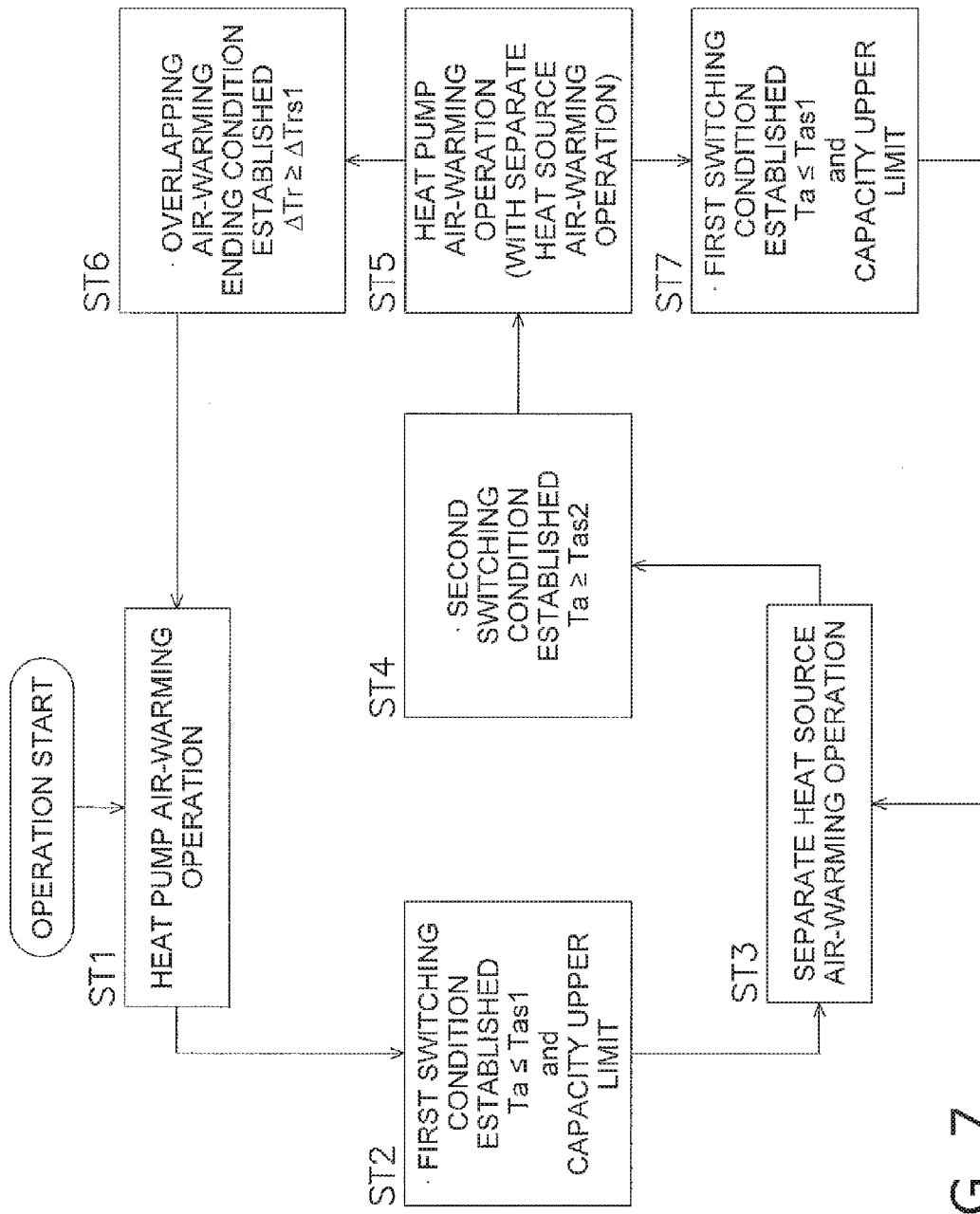
FIG. 7 is a flowchart showing the actions of switching between the heat pump air-warming operation and the separate heat source air-warming operation, according to Modification <C>.

For example, in step ST6, the control unit 8 may determine if the temperature difference ΔTr, which is resulted from subtracting the target indoor temperature Trs from the indoor temperature Tr, is equal to or greater than an overlapping air-warming ending air temperature difference ΔTrs1, as shown in FIG. 7. The reason this condition is employed in this modification is because when the heat pump air-warming operation is started while the separate heat source air-warming operation is continued and the temperature difference ΔTrs resulting from subtracting the target indoor temperature Trs from the indoor temperature Tr is great enough, the air-warming capability Qt, which is the total of the air-warming capability Qa of the heat pump section 60 and the air-warming capability Qg of the separate heat source section 70, is great enough, and it can therefore be presumed that the air-warming capability Qa of the heat pump section 60 is great enough, i.e., that the heat pump air-warming operation has taken effect.

Thus, in this modification, whether or not the heat pump air-warming operation has taken effect is determined on the basis of the temperature difference ΔTrs which is resulted from subtracting the target indoor temperature Trs from the indoor temperature Tr. It is possible with this determination method as well to appropriately determine whether or not the heat pump air-warming operation has taken effect, and to switch from the separate heat source air-warming operation to the heat pump air-warming operation.

This overlapping air-warming ending condition based on the temperature difference ΔTr may be used together with the overlapping air-warming ending condition based on the temperature Trd of the air heated by the indoor heat exchanger 42 as a refrigerant heat-radiator configuring the heat pump section 60, the air-warming capability Qa of the heat pump section 60, or the temperature Trd of the air heated by both the indoor heat exchanger 42 as a refrigerant heat-radiator and the furnace heat exchanger 55 as a separate heat source heat-radiator, in the above embodiment and the Modifications A and thereof.

<D>

In the above embodiment and the modifications thereof the configuration employed as the air conditioning system 1 is one in which air heated by the furnace heat exchanger 55 as a separate heat source heat-radiator configuring the separate heat source section 70 is further heated by the indoor heat exchanger 42 as a refrigerant heat-radiator configuring the heat pump section 60, after which the air is supplied into the rooms. Therefore, when the heat pump air-warming operation is started while the separate heat source air-warming operation is continued, there are cases in which the temperature of the air heated by the furnace heat exchanger 55 as a separate heat source heat-radiator is too high, whereby the temperature Thx of the indoor heat exchanger 42 as a refrigerant heat-radiator configuring the heat pump section 60, and consequently the refrigeration cycle of the heat pump section 60, shifts towards too high temperature and too high pressure, and the heat pump section 60 must be protected.

Figure 8:
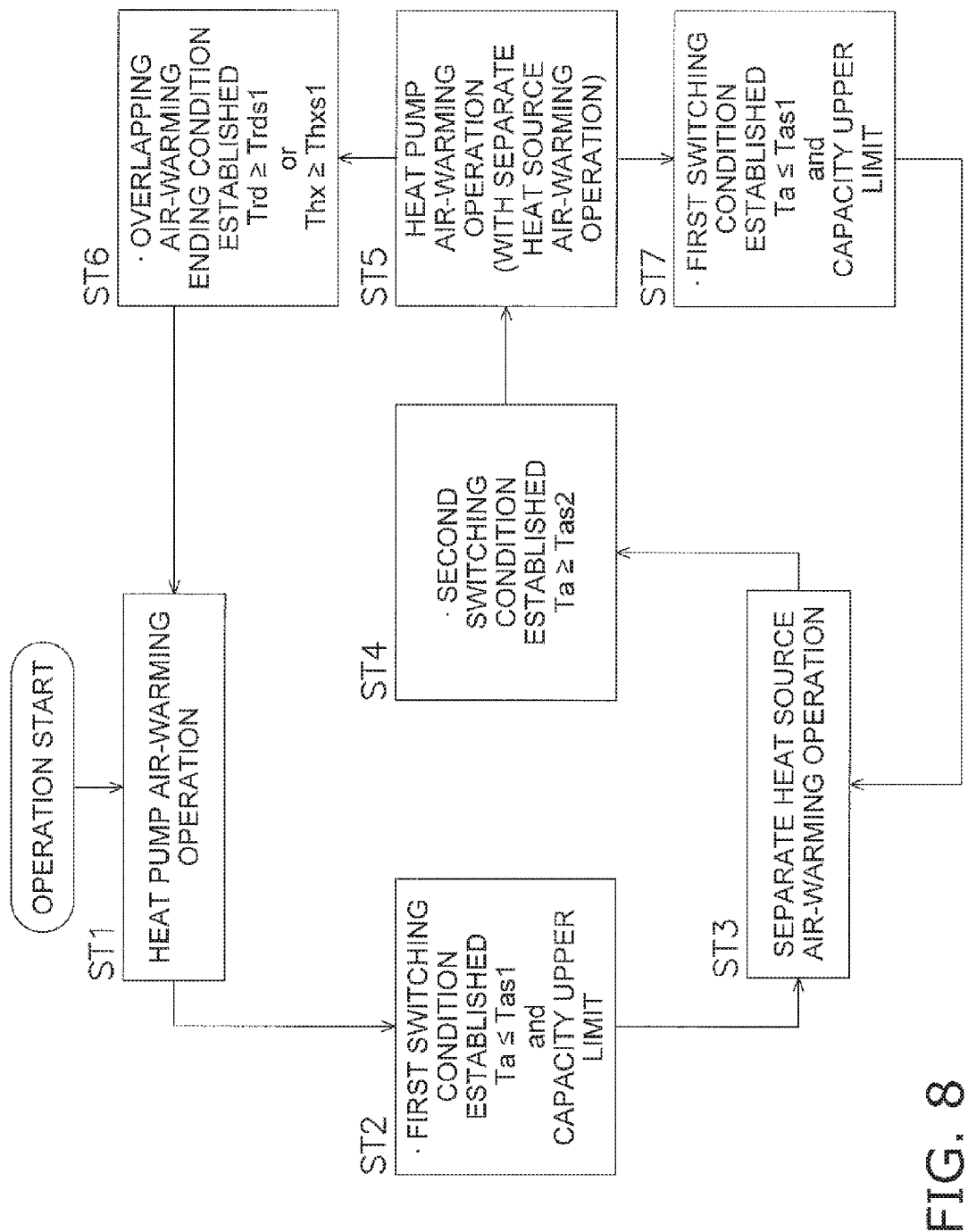
FIG. 8 is a flowchart showing the actions of switching between the heat pump air-warming operation and the separate heat source air-warming operation, according to Modification <D>.

In view of this, as the overlapping air-warming ending condition, the control unit 8 determines if the temperature Thx of the refrigerant flowing through the indoor heat exchanger 42 as a refrigerant heat-radiator is equal to or greater than an overlapping air-warming ending heat exchange temperature Thxs1, as shown in FIG. 8. FIG. 8 shows an example in which this condition is used together with the overlapping air-warming ending condition based on the temperature Trd of the air heated by the indoor heat exchanger 42 as a refrigerant heat-radiator configuring the heat pump section 60 in the above embodiment, but this condition may also be used together with the overlapping air-warming ending conditions of Modifications A to C.

Thus, in this modification, the heat pump section 60 can be protected on the basis of the temperature Thx of the refrigerant flowing through the indoor heat exchanger 42 as a refrigerant heat-radiator.

It is thereby possible in this modification to suppress the temporary drop in the indoor temperature Tr and the impairment of the comfort level while protecting the heat pump section 60 when the operation switches from the separate heat source air-warming operation to the heat pump air-warming operation.

<E>

The overlapping air-warming ending condition of step ST6 in the above embodiment is not limited to the conditions of the above embodiment or the modifications thereof.

Figure 9:
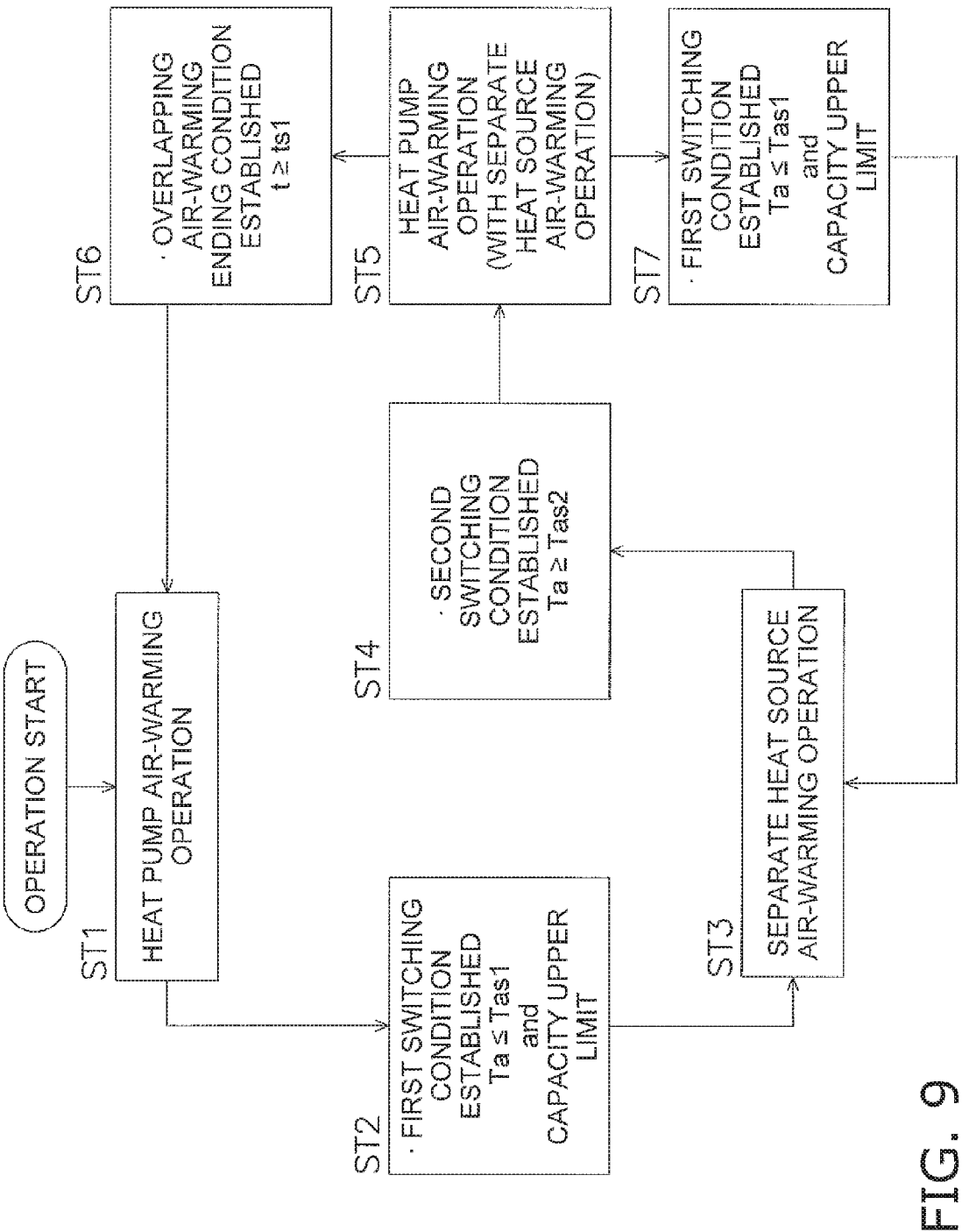
FIG. 9 is a flowchart showing the actions of switching between the heat pump air-warming operation and the separate heat source air-warming operation, according to Modification <E>.

For example, as the overlapping air-warming ending condition in step ST6, the control unit 8 may determine if the time t from when the heat pump air-warming operation was started while the separate heat source air-warming operation was continued has reached an overlapping air-warming ending time ts1, as shown in FIG. 9. It is possible with this determination method as well to appropriately determine whether or not the heat pump air-warming operation has taken effect, and to switch from the separate heat source air-warming operation to the heat pump air-warming operation.

The overlapping air-warming ending condition based on the time t from when the heat pump air-warming operation was started while the separate heat source air-warming operation was continued may be used together with the overlapping air-warming ending condition based on the temperature Trd of the air heated by the indoor heat exchanger 42 as a refrigerant heat-radiator configuring the heat pump section 60, the air-warming capability Qa of the heat pump section 60, the temperature Trd of the air heated by both the indoor heat exchanger 42 as a refrigerant heat-radiator and the furnace heat exchanger 55 as a separate heat source heat-radiator, and/or the temperature Thx of the indoor heat exchanger 42 as a refrigerant heat-radiator configuring the heat pump section 60 in the above embodiment and the Modifications A to D thereof.

<F>

In the above embodiment and the modifications thereof, the gas furnace unit 5 configuring the separate heat source section 70 (i.e., the furnace heat exchanger 55 as a separate heat source heat-radiator is disposed on the upwind side of the indoor unit 4 configuring the heat pump section 60 (i.e., the indoor heat exchanger 42 as a refrigerant heat-radiator) within the usage unit 3, but the present invention is not limited to this arrangement.

Figure 10:
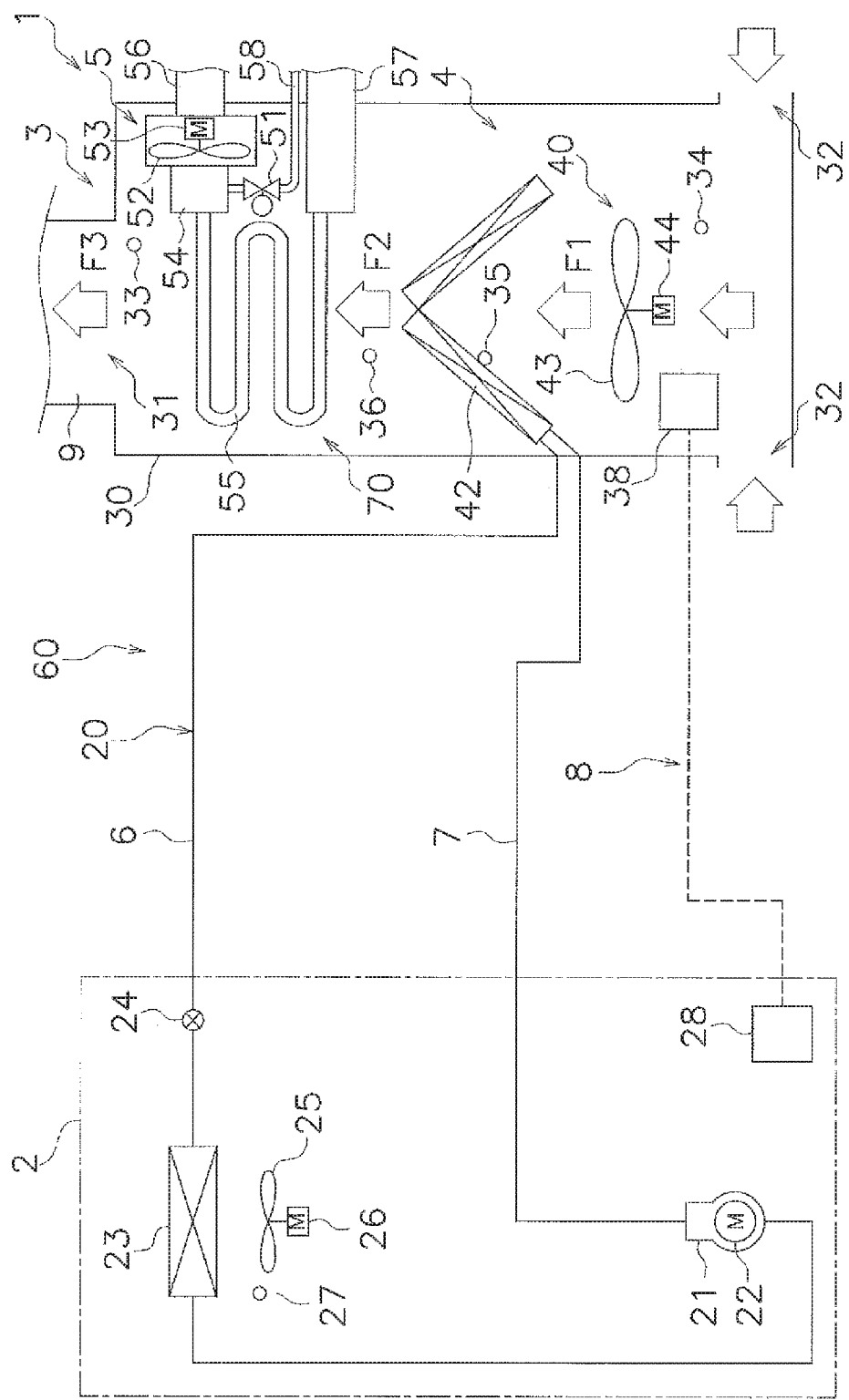
FIG. 10 is a simplified configuration diagram of the air conditioning system according to Modification <F>.

For example, the gas furnace unit 5 as the separate heat source section 70 (i.e., the furnace heat exchanger 55 as a separate heat source heat-radiator) may be disposed on the downwind side of the indoor unit 4 as the heat pump section 60 (i.e., the indoor heat exchanger 42 as a refrigerant heat-radiator), as shown in FIG. 10.

With such a configuration, it is possible to perform the same action of switching between the heat pump air-warming operation and the separate heat source air-warming operation as those in the above embodiment and the Modifications A to C and E thereof, excluding Modification D. In step ST6, when an overlapping air-warming ending condition is employed which is based on the temperature Trd of the air heated by the indoor heat exchanger 42 as a refrigerant heat-radiator configuring the heat pump section 60, a temperature sensor 36 must be provided between the indoor heat exchanger 42 as a refrigerant heat-radiator and the furnace heat exchanger 55 as a separate heat source heat-radiator.

<G>

In the above embodiment and the modifications thereof the gas furnace unit configuring the separate heat source section 70 and the indoor unit 4 configuring the heat pump section 60 are configured as an integrated usage unit 3, but the present invention is not limited to this arrangement.

Figure 11:
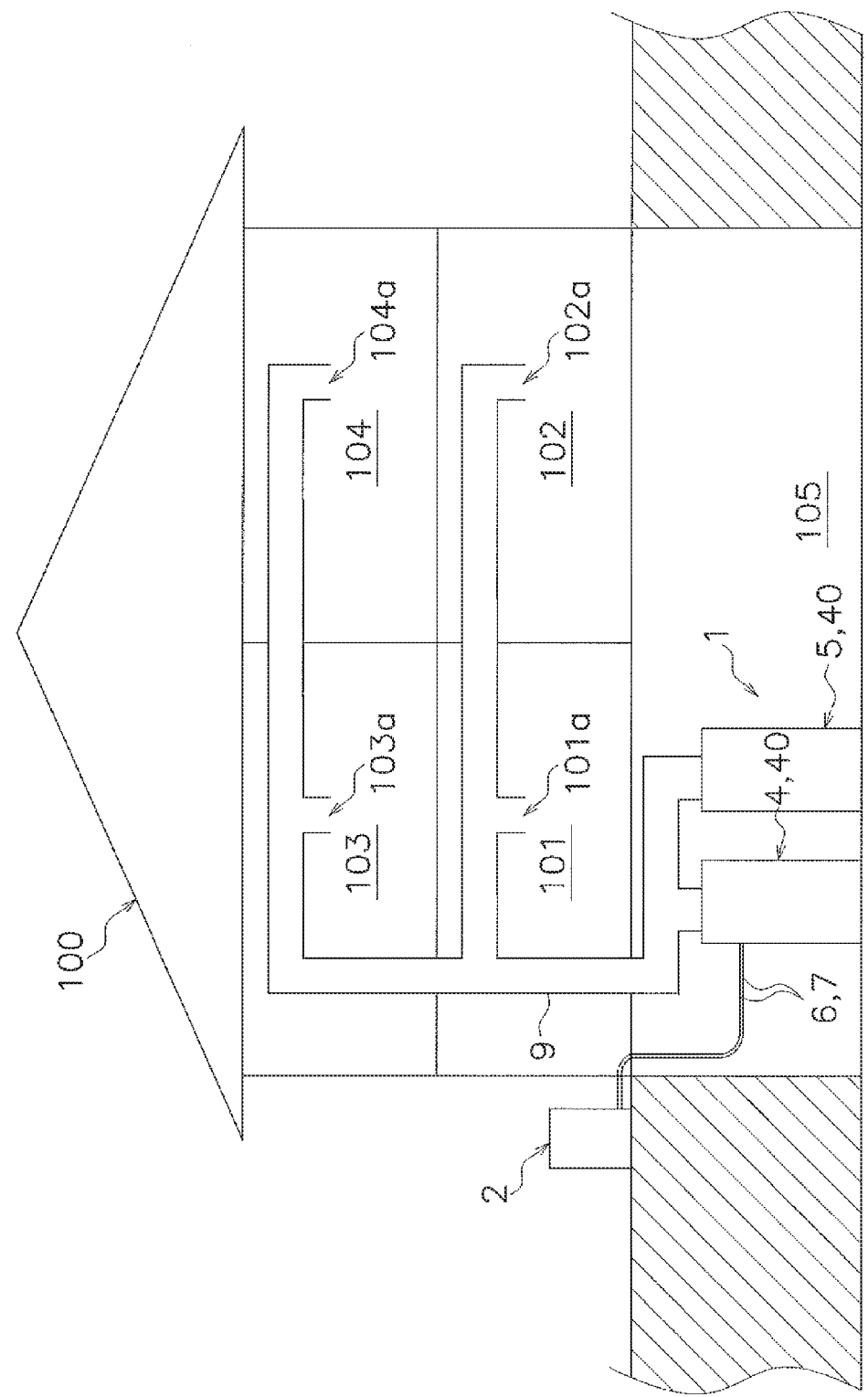
FIG. 11 is a schematic diagram showing the arrangement of the air conditioning system according to Modification <G>.
Figure 12:
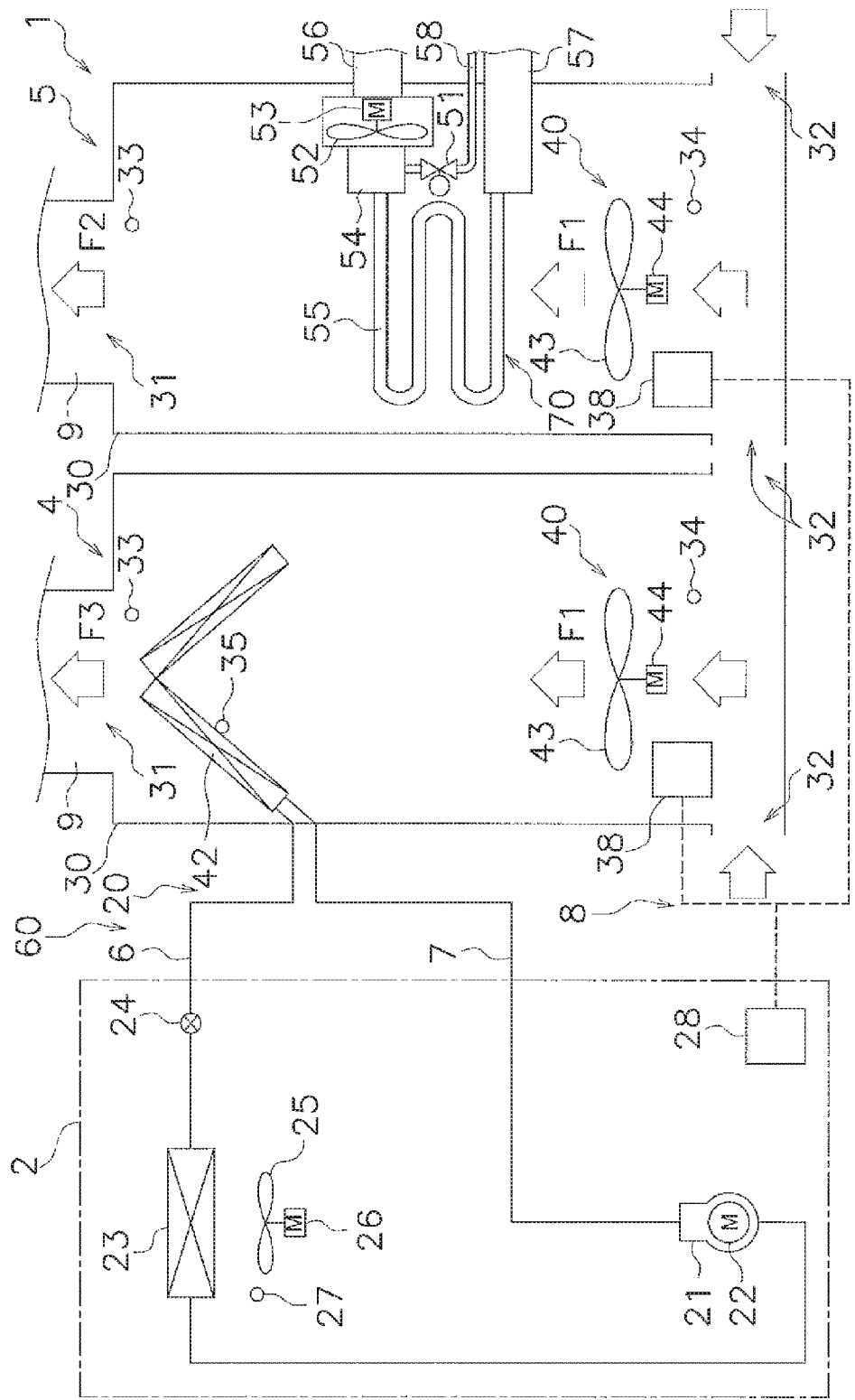
FIG. 12 is a simplified configuration diagram of the air conditioning system according to Modification <G>.

For example, the gas furnace unit 5 configuring the separate heat source section 70 and the indoor unit 4 configuring the heat pump section 60 may be arranged separately as shown in FIGS. 11 and 12. In this case, the indoor air blower 40 and other various devices and/or sensors that had been shared between the gas furnace unit 5 and the indoor unit 4 in the above embodiment and the modifications thereof must be provided to both the gas furnace unit 5 and the indoor unit 4.

With such a configuration, it is possible to perform the same action of switching between the heat pump air-warming operation and the separate heat source air-warming operation as those in the above embodiment and the Modifications C and E thereof, excluding Modifications A, and D.

<H>

In the above embodiment and the modifications thereof a single usage unit 3 (indoor unit 4) is connected to the outdoor unit 2, but the present invention is not limited to this arrangement.

Figure 13:
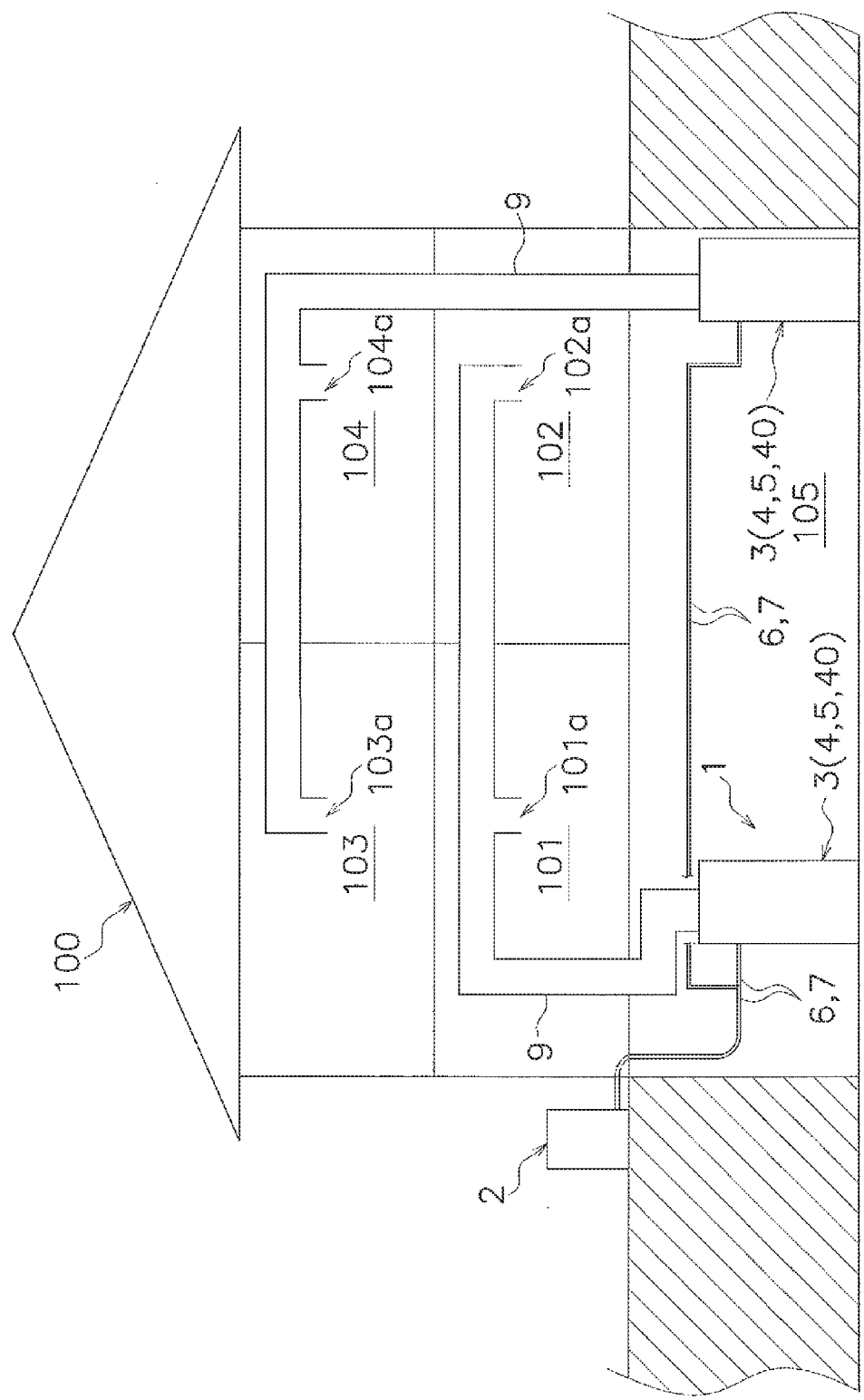
FIG. 13 is a schematic diagram showing the arrangement of the air conditioning system according to Modification <H>.
Figure 14:
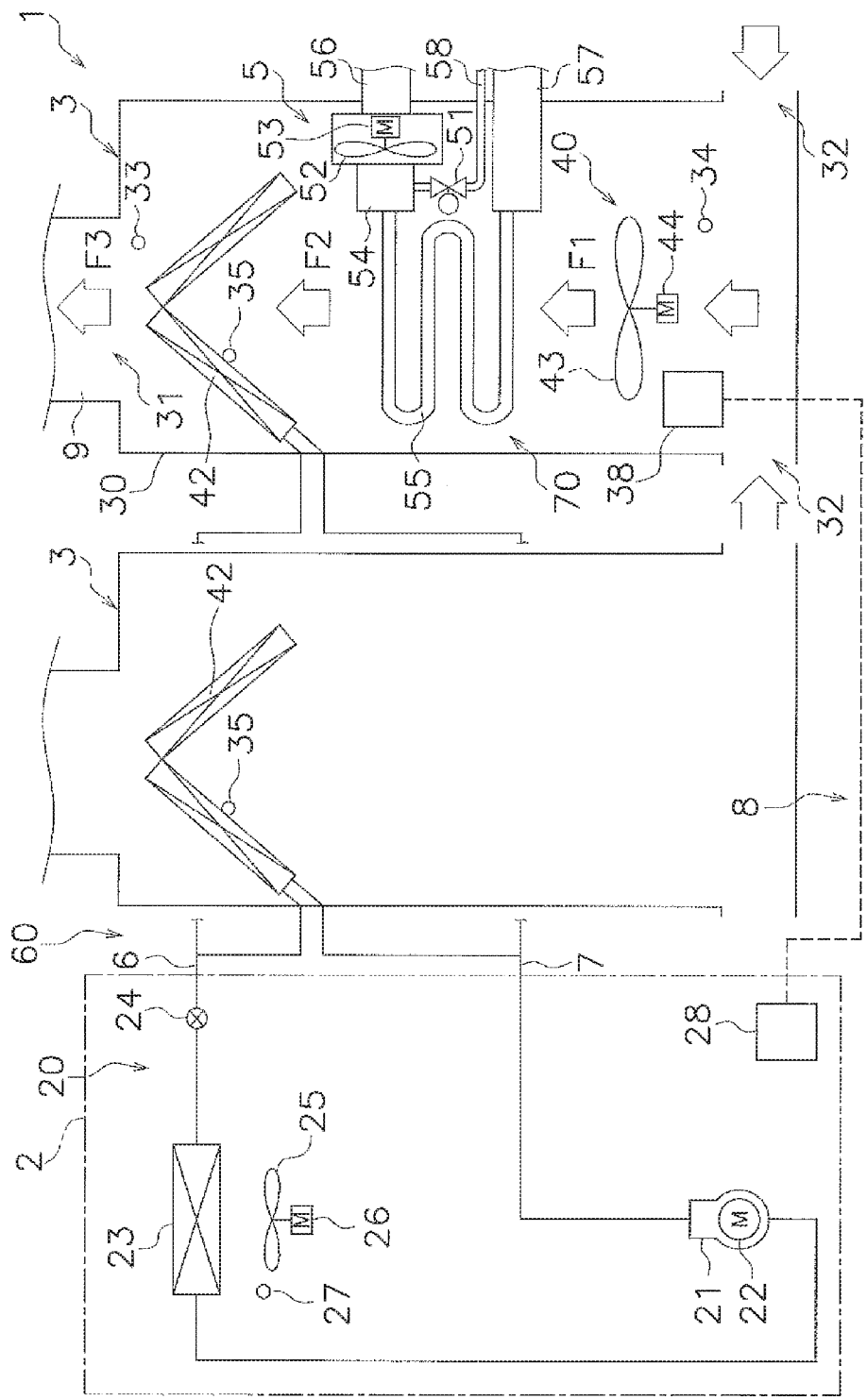
FIG. 14 is a simplified configuration diagram of the air conditioning system according to Modification <H>.

For example, a plurality (two in this modification) of usage units 3 (indoor units 4) may be connected to the outdoor unit 2 via the refrigerant interconnection pipes 6, 7, one usage unit 3 may be used to air-condition the rooms 103, 104, and the other usage unit 3 may be used to air-condition the rooms 101, 102, as shown in FIGS. 13 and 14. In FIG. 14, the details of one usage unit 3 are illustrated, and for the other usage unit 3, only the indoor heat exchanger 42 as a refrigerant heat-radiator configuring the heat pump section 60 is illustrated. When a configuration is employed in which a plurality of usage units 3 are connected to the outdoor unit 2, rather than being provided in the basement 105, the corresponding usage units 3 may be provided in the rooms they are used to air-condition or in proximity thereto. When usage units 3 corresponding to the rooms 101 to 104 are provided, rather than being duct-type units, the usage units 3 may be installed as being placed on the floors, mounted on the walls, installed on the ceilings, or the like of the rooms 101 to 104. When usage units 3 are provided to the rooms 101 to 104, gas furnace units 5 configuring separate heat source sections 70 and indoor units 4 configuring heat pump sections 60 may be placed separately for the different rooms, similar to Modification E.

With such a configuration, it is possible to perform the same action of switching between the heat pump air-warming operation and the separate heat source air-warming operation as those in the above embodiment and the Modifications A to E.

<I>

In the above embodiment and the modifications thereof the heat pump section 60 has a refrigerant circuit 20 solely for air-warming, but a four-way switching valve or the like may be provided to the refrigerant circuit 20 to enable switching the refrigerant circulation direction, and the configuration may be enabled for an air-cooling operation.

<J>

In the above embodiment and the modifications thereof, a gas furnace unit 5 which uses the combustion of fuel gas as a heat source is employed as the separate heat source section 70, but the present invention is not limited to this arrangement. For example, anything that has a separate heat source from the heat pump section 60, such as a hot water boiler or an electric heater, can be employed as the separate heat source section 70.

INDUSTRIAL APPLICABILITY

The present invention is widely applicable to an air conditioning system that has a heat pump section for performing indoor air-warming by using a vapor-compression refrigeration cycle, and a separate heat source section for performing indoor air-warming by using a heat source separate from the heat pump section.

What is claimed is:

1. An air conditioning system, comprising:
   a heat pump section arranged and configured to perform indoor air-warming by using a vapor-compression refrigeration cycle;
   a separate heat source section arranged and configured to perform indoor air-warming by using a heat source separate from the heat pump section; and
   a control unit configured to control actions of the heat pump section and the separate heat source section,
   when an operation is switched from a separate heat source air-warming operation performing indoor air-warming by using the separate heat source section to a heat pump air-warming operation performing indoor air-warming by using the heat pump section, the control unit starting the heat pump air-warming operation while the separate heat source air-warming operation is continued, and after an overlapping air-warming ending condition is met, the control unit ending the separate heat source air-warming operation, and
   the overlapping air-warming ending condition being that a temperature difference resulting from subtracting a target indoor temperature from an indoor temperature is equal to or greater than an overlapping air-warming ending air temperature difference.

* * * * *